R. BOLES.
NUT LOCKING DEVICE.
APPLICATION FILED MAR. 31, 1913.
1,098,219.
Patented May 26, 1914.
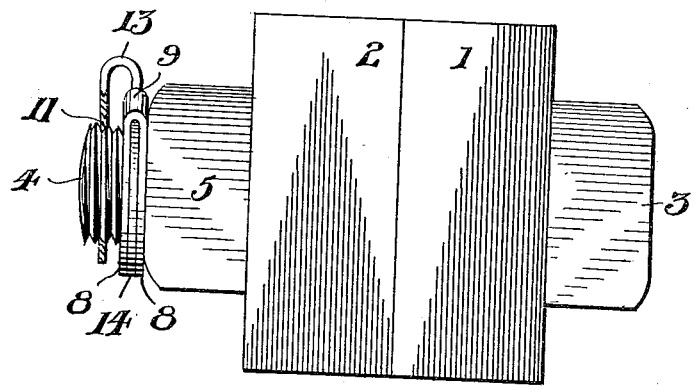
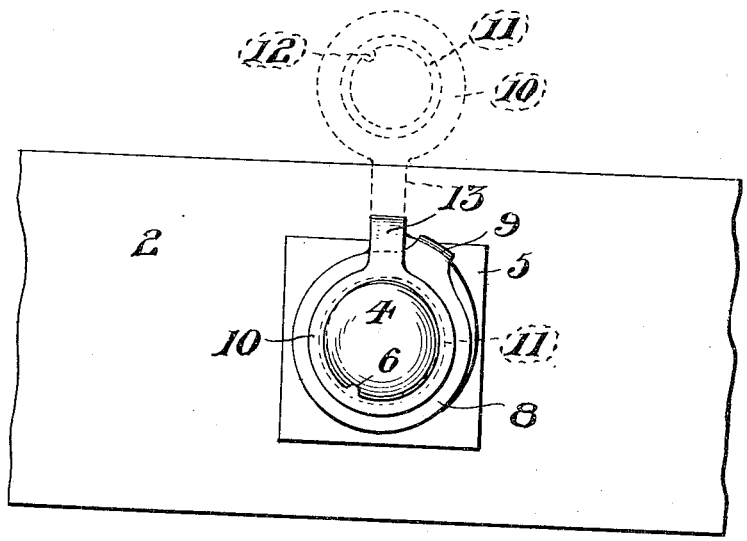
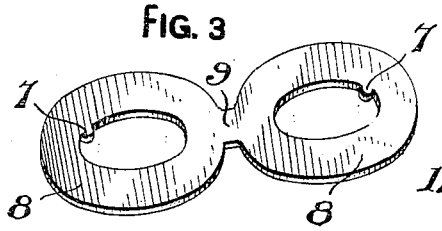
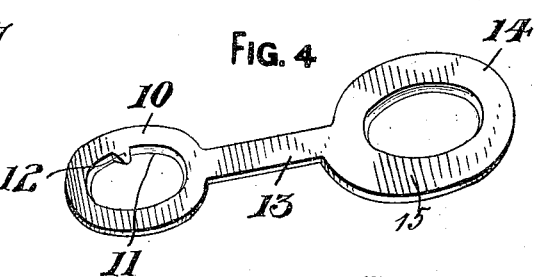
WITNESSES
INVENTOR
Robert Boles
By Henry C. Evert
ATTORNEY

UNITED STATES PATENT OFFICE.

ROBERT BOLES, OF ELDERSVILLE, PENNSYLVANIA.

NUT-LOCKING DEVICE.

1,098,219.  Specification of Letters Patent.  Patented May 26, 1914.

Application filed March 31, 1913. Serial No. 757,940.

*To all whom it may concern:*

Be it known that I, ROBERT BOLES, a citizen of the United States of America, residing at Eldersville, in the county of Washington and State of Pennsylvania, have invented certain new and useful Improvements in Nut-Locking Devices, of which the following is a specification, reference being had therein to the accompanying drawing.

This invention relates to a nut locking device, and the primary object of my invention is to provide a device that can be advantageously used in connection with rail joints, bridges, rolling stock and structures subjected to vibrations, which have a tendency to displace nuts relatively to bolts, tie rods and other structures.

Another object of this invention is to provide a nut locking device embodying a double washer and a gripping washer, the double washer being arranged to hold the gripping washer whereby it can be bent into engagement with a bolt to prevent a nut from becoming accidentally displaced upon the bolt.

A further object of this invention is to accomplish the above results by a mechanical construction that is simple, durable, inexpensive to manufacture, easy to install, and highly efficient for the purposes for which it is intended.

With the above and other objects in view the invention resides in the novel construction, combination and arrangement of parts to be hereinafter specifically described and then claimed.

Reference will now be had to the drawing, wherein:—

Figure 1 is a side elevation of the nut locking device partly broken away and partly in section, Fig. 2 is an end view of the same, Fig. 3 is a perspective view of the double washer, and Fig. 4 is a perspective view of the gripping washer.

In the drawing 1 and 2 denote, by way of example, two pieces of material connected by a bolt 3, having the threaded end 4 thereof protruding from the piece of material 2 to receive a nut 5. The threaded end 4 of the bolt has a longitudinal groove 6 to receive the inwardly projecting lugs 7 of locking washers 8. The washers are made of malleable metal and connected by a tongue 9, whereby the washers can be bent into parallelism to form a double washer that engages the outer face of the nut 5.

The reference character 10 denotes a holding washer which has the inner edge thereof beveled, as at 11 and provided with a lug 12 adapted to engage in the groove 6. Projecting from the holding washer 10 is a tongue 13 which terminates in a locking washer 14 which is provided with an eccentric portion 15 and said locking washer when in operative position is placed between the locking washers 8, as shown in Fig. 1. The tongue 13 is bent whereby the holding washer will be placed in parallel relation with respect to the locking washer and said holding washer, when in holding position is mounted upon the threaded end 4 of the bolt. The locking washers are forced in operative position by the tongue 9 riding against the said eccentric portion 15 and through the medium of the said eccentric portion the locking washers 8 and 14 are forced into engagement between the threads of the bolt. The resiliency of the material from which the holding washer 10 is made is such that the beveled edges of said washer engage and interlock with the threads of the bolt, consequently the inner locking washer 8, due to the action of the locking washer 14 and tongue 9 will be held against the outer face of the nut and prevent the washer from sliding longitudinally or becoming accidentally displaced. The lugs 7 and 12 prevent the washers from rotating relatively to the bolt and with the locking washers holding the nut 5 firmly against the piece of material 2, it is apparent that the bolt is locked to a certain degree and cannot rotate relatively to the material through which it extends.

One embodiment of the invention has been illustrated, but it is to be understood that the structural elements are susceptible to such variations and modifications as fall within the scope of the appended claims.

What I claim is:—

1. In a nut locking device, the combination with a bolt having a threaded end thereof provided with a longitudinal groove, and a nut screwed upon the threaded end of said bolt, of a pair of locking washers having lugs extending into the groove of said bolt, a locking washer interposed between said pair of locking washers and having a portion of its outer edge eccentrically disposed, a tongue connecting said pair of locking washers and engaging said eccentric edge for maintaining said locking washers in position, a tongue carried by the interposed locking washer, and a holding washer carried by said tongue and having an inwardly projecting lug adapted to engage in the groove of said bolt.

2. In a nut locking device, the combination with a bolt having a threaded end thereof grooved, of washers connected by a tongue and bent into parallelism and arranged upon said bolt, lugs carried by said washers and extending into the groove of said bolt, a locking washer arranged between the first mentioned washers and having a portion of its outer edge eccentrically disposed, said tongue engaging said eccentric portion for maintaining said washers in locking position, a malleable tongue carried by said locking washer, a holding washer carried by said malleable tongue and having the inner edges thereof beveled and adapted to engage the threads of said bolt, said malleable tongue and holding washer holding the locking washer in locking position, and an inwardly projecting lug carried by said holding washer for engaging in the groove of said bolt.

In testimony whereof I affix my signature in the presence of two witnesses.

ROBERT BOLES.

Witnesses:
    MAX H. SROLOVITZ,
    KATHERINE ERRETT.

---

Copies of this patent may be obtained for five cents each, by addressing the "Commissioner of Patents, Washington, D. C."